US010481659B2

(12) United States Patent
Gambon et al.

(10) Patent No.: US 10,481,659 B2
(45) Date of Patent: Nov. 19, 2019

(54) RACK RESOURCE UTILIZATION

(71) Applicant: International Business Machines Corporation, Armonk, NY (US)

(72) Inventors: Kenneth T. Gambon, Erie, CO (US); Bret W. Lehman, Raleigh, NC (US); Christopher L. Molloy, Raleigh, NC (US); Tenley D. Jackson, Livonia, MI (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 15/059,870

(22) Filed: Mar. 3, 2016

(65) Prior Publication Data
US 2017/0255243 A1 Sep. 7, 2017

(51) Int. Cl.
G06F 1/32 (2019.01)
G06F 1/26 (2006.01)
G06F 1/3206 (2019.01)

(52) U.S. Cl.
CPC ............ *G06F 1/266* (2013.01); *G06F 1/3206* (2013.01)

(58) Field of Classification Search
CPC ................................................ H01H 2300/03
USPC ............................................................ 700/1
See application file for complete search history.

(56) References Cited

U.S. PATENT DOCUMENTS

| 7,865,272 | B2 | 1/2011 | Spitaels et al. |
| 8,627,123 | B2* | 1/2014 | Jain .................. G06F 1/3209 713/310 |
| 8,766,474 | B2* | 7/2014 | Carralero ................ H02J 3/381 307/38 |
| 2004/0139363 | A1* | 7/2004 | Elbe ......................... G06F 1/08 713/400 |
| 2011/0296213 | A1* | 12/2011 | Ferlitsch ................ G06Q 50/06 713/320 |
| 2014/0310537 | A1* | 10/2014 | Messick .................. G06F 1/263 713/300 |

(Continued)

FOREIGN PATENT DOCUMENTS

| JP | 2010066850 A | 3/2010 |
| WO | 2015066048 A1 | 5/2015 |

OTHER PUBLICATIONS

Broyles et al., "IBM Energy Scale for POWER7 Processor-Based Systems", Mar. 2013, © IBM Corporation, pp. 1-76.

(Continued)

*Primary Examiner* — Min Huang
(74) *Attorney, Agent, or Firm* — Gilbert Harmon, Jr.

(57) ABSTRACT

An approach to managing power distribution to computing devices, the approach involving monitoring power consumption of a plurality of computing devices and power draw on a plurality of power distribution units, wherein the plurality of power distribution units distribute power to the plurality of computing devices, determining that any of the plurality of power distribution units are approaching respective power thresholds and responsive to determining that any of the plurality of power distribution units are approaching the respective power thresholds, taking one or more actions to manage power distribution to the plurality of computing devices, wherein the one or more actions are based on a set of rules and the one or more actions comprise configuring a drawing of unequal amounts of power.

20 Claims, 4 Drawing Sheets

(56) References Cited

U.S. PATENT DOCUMENTS

2015/0338896 A1* 11/2015 Khatri .................. G06F 1/324
                                                       713/320
2017/0031431 A1* 2/2017 Khatri .................. G06F 1/3296

OTHER PUBLICATIONS

"Country Selection Page", APC by Schneider Electric, Copyright © American Power Conversion Corp., <http://www.apc.com/template/country_selection_cfm?ref_url=/products/family/index.cfm?id=70>, printed Jan. 11, 2016, 1 page.

"IBM Systems Director Active Energy Manager", IBM, <http://www-03.ibm.com/systems/director/aem/index.html>, printed Dec. 16, 2015, 2 pages.

* cited by examiner

RACK RESOURCE UTILIZATION

BACKGROUND

The present invention relates generally to the field of hardware racks, and more particularly to power distribution units.

A hardware rack is a structure designed to physically hold a plurality of hardware devices such as, but not limited to, server computers and/or other similar computing devices. Hardware racks can be found in data centers for example and can be designed for structural support of the devices they hold, cooling and power efficiency of the devices and/or a neat arrangement of cables and wires associated with the devices. Power distribution units (PDUs) are units that can connect to a power source and can have a plurality of outlets for the distribution of the power to connected devices, such as the previously mentioned hardware devices which may be held in a hardware rack. PDUs can additionally have other I/O ports such as but not limited to, Ethernet ports and USB ports, and can be attached to a hardware rack to provide power and/or network connectivity to any connected devices.

Power supply units (PSUs) are units in computing devices which convert incoming power (e.g., power from a PDU) into a form that can be used by internal components of the computing devices, e.g., incoming power can be converted from AC to DC, etc. Some computing devices have a plurality of PSUs for a redundant supply of power and each of a plurality of PSUs in a computing device can in some cases be connected to separate PDUs.

SUMMARY

According to one embodiment of the present invention, a method for managing power distribution to computing devices is provided, the method comprising monitoring power consumption of a plurality of computing devices and power draw on a plurality of power distribution units, wherein the plurality of power distribution units distribute power to the plurality of computing devices; determining that any of the plurality of power distribution units are approaching respective power thresholds; and responsive to determining that any of the plurality of power distribution units are approaching the respective power thresholds, taking one or more actions to manage power distribution to the plurality of computing devices, wherein the one or more actions are based on a set of rules and the one or more actions comprise configuring a drawing of unequal amounts of power. A corresponding computer program product and computer system are also disclosed herein.

DETAILED DESCRIPTION

Embodiments of the present invention recognize that the use of power distribution units (PDUs) can be limited when multiple devices drawing power from them are connected. For example, some outlets on the PDU may go unused in order to prevent a power overdraw situation wherein the power that can be drawn from all the devices connected to the PDU can exceed the maximum power load the PDU is able to distribute from the power source associated with the PDU. This situation can create the need for additional PDUs which can take up space on a rack otherwise used for additional hardware devices, such as, but not limited to server computers. With this in mind, embodiments of the present invention present a solution designed to improve rack resource utilization, i.e., power supplied for distribution and available rack space, by optimizing the functioning of PDUs distributing power to connected hardware devices.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
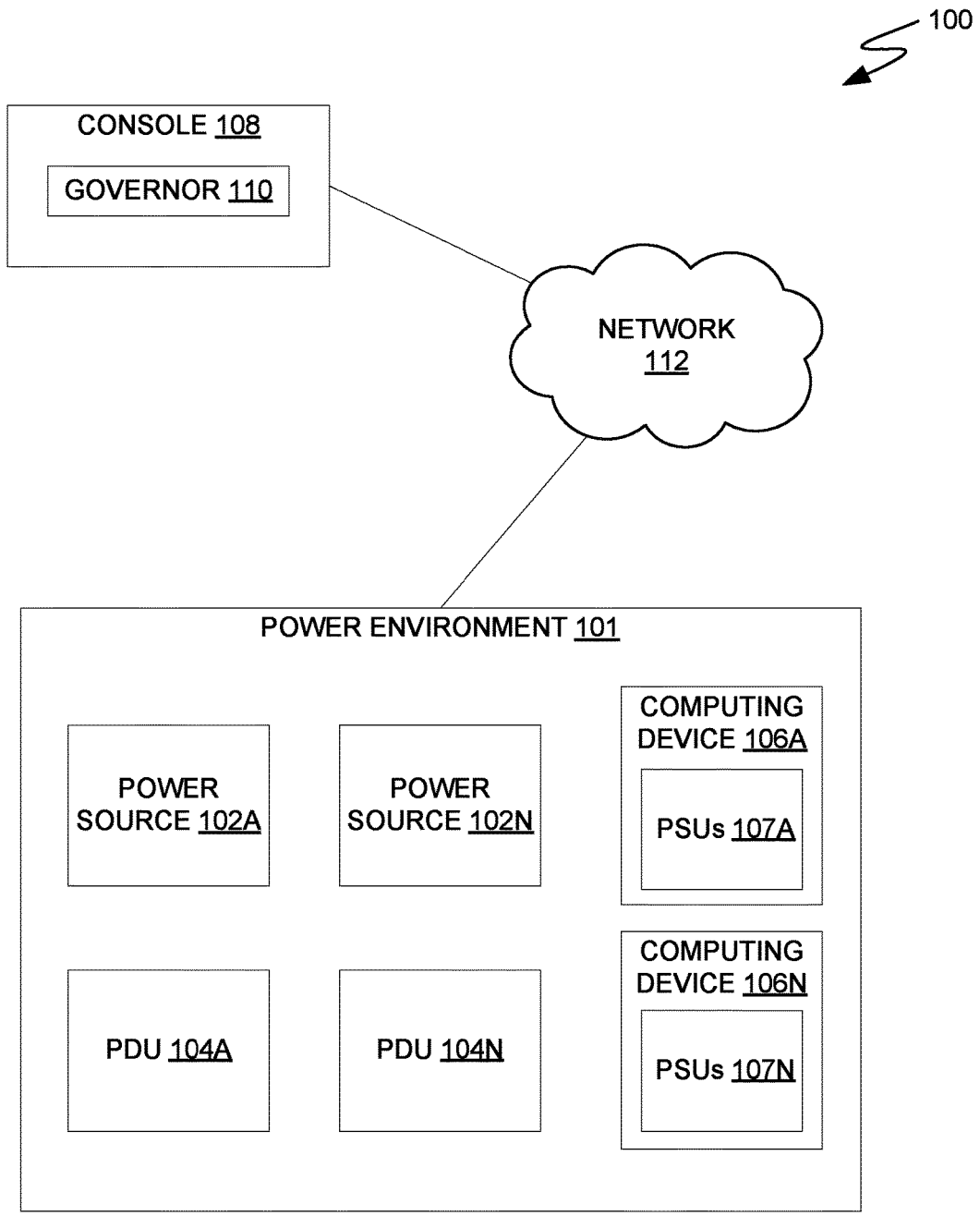
FIG. 1 is a functional block diagram illustrating a distributed data processing environment, in accordance with an embodiment of the present invention.

The present invention will now be described in detail with reference to the figures. FIG. 1 is a functional block diagram illustrating a rack computing environment 100, in accordance with an embodiment of the present invention. Rack computing environment 100 comprises console 108 and power environment 101, interconnected over network 112. Power environment 101 comprises power sources 102A-N, PDUs 104A-N, and computing devices 106A-N, which are respectively representative of any number of power sources, PDUs and computing devices. Additionally, each of PDUs 104A-N and computing devices 106A-N can be interconnected with console 108 over network 112. Each of computing devices 106A-N further respectively comprise PSUs 107A-N, wherein each of PSUs 107A-N are representative of a plurality of PSUs in their respective computing device, e.g., PSUs 107A are representative of a plurality of PSUs within computing device 106A, etc.

In one embodiment according to rack computing environment 100 (FIG. 1), power source 102A is connected to PDU 104A for providing power only to PDU 104A, and so forth for power sources 102B-N and PDUs 104B-N. Additionally, PDUs 104A-N can be connected to computing devices 106A-N for the distribution of power (e.g., electrical power) to these devices. It should be noted that computing devices 106A-N can be contained in one or more hardware racks, e.g., such as those that can be found in a data center.

In another embodiment of the present invention, power sources 102A-N can be connected to PDUs 104A-N and one PDU can be responsible for the distribution of power to one rack of computing devices, e.g., PDU 104A can be responsible for the distribution of power to one portion of computing devices 106A-N whereas PDU 104N can be responsible for the distribution of power to another portion of computing devices 106A-N etc.

Console 108 can be a laptop computer, tablet computer, netbook computer, personal computer (PC), a desktop computer, a personal digital assistant (PDA), a smart phone, or any programmable electronic device capable of communicating with PDUs 104A-N and computing devices 106A-N via network 112. Network 112 can be, for example, a local area network (LAN), a wide area network (WAN) such as the Internet, or a combination of the two, and can include wired, wireless, or fiber optic connections. In general, network 112 can be any combination of connections and protocols that will support communications between console 108, PDUs 104A-N and computing devices 106A-N. Console 108 can include internal and external hardware components, as depicted and described in further detail with respect to FIG. 4.

In various embodiments of the present invention, computing devices 106A-N can be laptop computers, tablet computers, netbook computers, personal computers (PCs), desktop computers, personal digital assistants (PDAs), smart phones, or any programmable electronic devices capable of communicating with console 108 via network 112.

Figure 2:
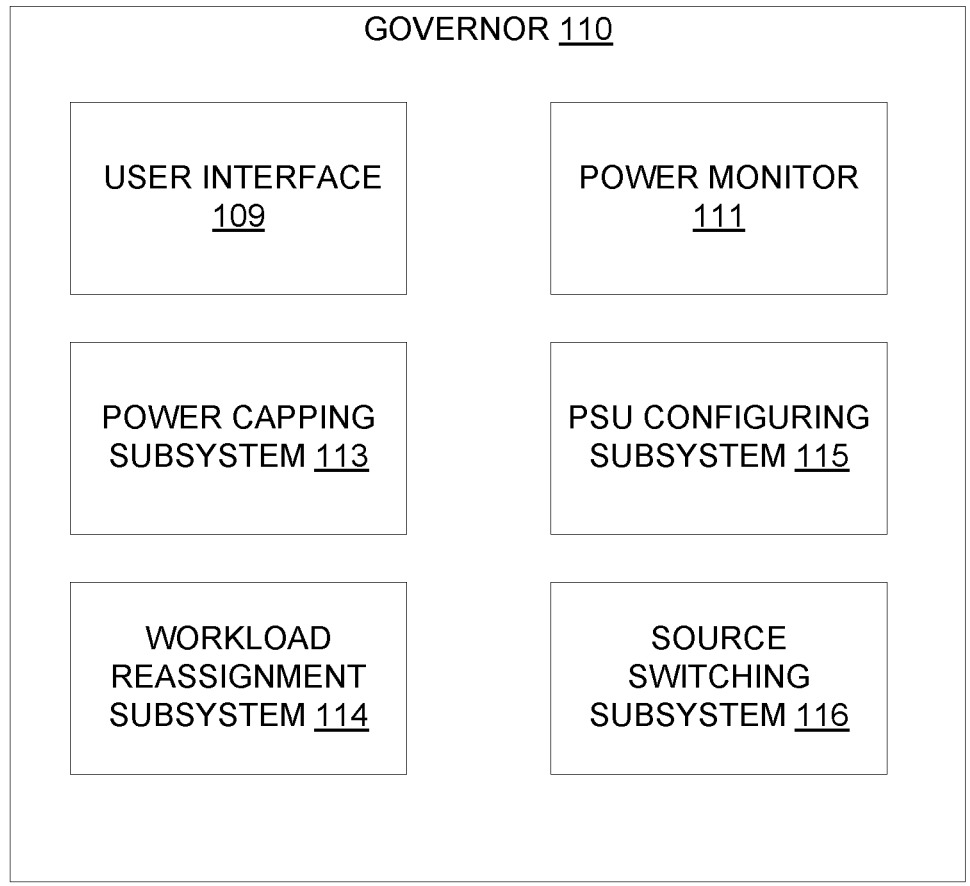
FIG. 2 is a functional block diagram illustrating components of a governor program on a console computer within the data processing environment of FIG. 1, in accordance with an embodiment of the present invention.

Console 108 comprises governor 110 which is a software program allowing a user of console 108 to configure power and/or network management options associated with PDUs 104A-N and computing devices 106A-N. FIG. 2 is a functional block diagram which depicts process components of governor 110, in accordance with an embodiment of the present invention. Governor 110 comprises user interface 109, power monitor 111, power capping subsystem 113, workload reassignment subsystem 114, PSU configuring subsystem 115 and source switching subsystem 116.

Power monitor 111 is a subsystem configured to monitor which of computing devices 106A-N are connected to PDUs 104A-N, monitor the power consumption and/or network traffic of any of computing devices 106A-N and monitor the total power being drawn from individual PDUs 104A-N. Power monitor 111 can determine when any of PDUs 104A-N are approaching the maximum power load (i.e., power threshold) they are capable of distributing and subsequently communicate with other subsystems of governor 110 to take action to manage the distribution of power.

Power capping subsystem 113 is a subsystem which can dynamically cap (i.e., limit) the total power consumption (i.e., power draw) of any of computing devices 106A-N. Workload reassignment subsystem 114 can compute the total amount of power consumption associated with a particular workload on any of computing devices 106A-N and reassign (i.e., move) the workload to a different computing device on another hardware rack, thus transferring the power consumption associated with that workload to a different power supply. A workload as the term is used herein can refer to a set of computing tasks being performed by program applications on a computing device (e.g., computing devices 106A-N), thus consuming available processing resources on said device.

PSU configuring subsystem 115 is a subsystem of governor 110 which can adjust the individual amounts of power being drawn by each of a plurality of PSUs within computing devices 106A-N, wherein each of the plurality of PSUs for a given computing device can be connected to a different PDU (i.e., of PDUs 104A-N). Source switching subsystem 116 is a subsystem configured to activate a mechanism, such as, but not limited to, a transfer switch, which is generally a device designed to switch a power load between different sources, to manage the supply of power to PDUs 104A-N from power sources 102A-N.

Governor 110 can be configured to automatically, dynamically manage power distribution and/or consumption via the functioning of the subsystems discussed herein, based on a set of default or preconfigured rules as will be described in greater detail subsequently. The configuring of governor 110 as described herein can be accomplished via a user interaction with user interface 109, which can be rendered on a display screen of console 108. It should be further noted that optionally, a user of console 108 can also manually manage power distribution and/or consumption, such as in any manner described herein, through the use of user interface 109.

Figure 3:
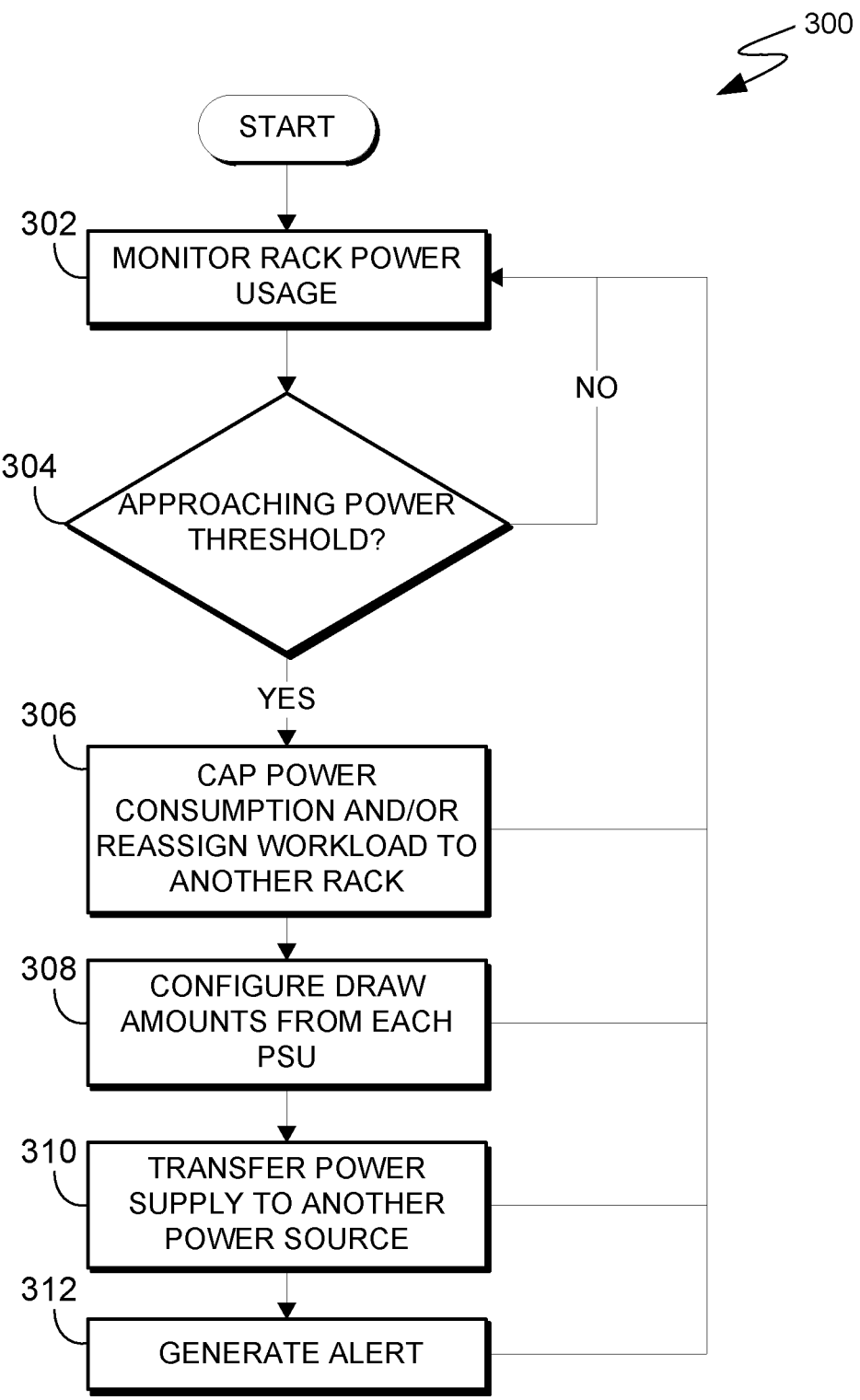
FIG. 3 is a flowchart illustrating operational steps of the governor program, in accordance with an embodiment of the present invention.

FIG. 3 is a flowchart 300 depicting operational steps of governor 110 for managing power distribution and consumption, in accordance with an embodiment of the present invention. It should be noted that while embodiments disclosed herein refer primarily to the monitoring and management of power consumption and distribution, other embodiments of the present invention can additionally or alternatively monitor and manage network traffic and the distribution of network connectivity, such as, but not limited to, connectivity to the internet and/or an intranet.

Using power monitor 111, governor 110 monitors, at step 302, the power consumption of computing devices 106A-N, as well as the total power being drawn from each of PDUs 104A-N. Power monitor 111 determines, at step 304, if the total power being drawn from any of PDUs 104A-N is approaching the power threshold that those PDUs 104A-N are capable of supplying from power sources 102A-N. As an example of approaching a power threshold, if governor 110 determines that any of PDUs 104A-N are distributing a power load (which can be a value in a unit of power, e.g., a watt (W), a kilowatt (kW), etc.) that is at least 90% of the value of their respective power thresholds, governor 110 can begin to take actions to manage power distribution and/or consumption.

It should be noted that the threshold percentage for which power monitor 111 can determine that a PDU is approaching its power threshold for distribution before governor 110 takes an action can be a default or predefined value (e.g., 75%, 90%, etc.) and can be configured via user interface 109. Alternatively, a determination that a PDU is approaching its power threshold for distribution can be dynamically determined by power monitor 111, e.g., based on predefined operational parameters and/or historical usage statistics, etc.

Responsive to power monitor 111 determining that any of PDUs 104A-N are approaching their respective power thresholds, such as in the manner previously described, governor 110 can take one or more actions in a dynamic or predetermined order, wherein the actions are associated with the management of power distribution and/or consumption and can be based upon a set of default or preconfigured rules. The default or preconfigured rules can be associated with, but are not limited to, device priorities, power consumption maximums and minimums for devices and workload priorities and these types of rules can further be used in conjunction. Rules associated with device priorities can be based on a selection of certain devices which have priority for power consumption over other devices in a hardware rack, for example. A workload priority can be a predefined order of importance for various types of workloads which governor 110 can use when managing power distribution and/or consumption.

At step 306, power capping subsystem 113 caps the maximum power consumption of one or more computing devices (e.g., any of computing devices 106A-N) based on the default or preconfigured rules. As an illustrative example, in rack computing environment 100 (FIG. 1), power capping subsystem 113 can be programmed to dynamically cap the power consumption of any of computing devices 106A-N that are processing workloads associated with development and testing before capping the power consumption of any of computing devices 106A-N processing workloads associated with production. This capping of power consumption can comprise, for example, a suspension of processes associated with a particular type of workload (e.g., testing, development, production, etc.) on any of computing devices 106A-N.

Workloads associated with development and testing can comprise, for example, any computing tasks related to the development of software programs and/or the testing of software programs to identify potential errors or exceptions, whereas workloads associated with production can comprise any computing tasks related to the deployment of services such as, but not limited to, software services, to be offered to one or more customers or client devices.

Additionally or alternatively, at step 306, workload reassignment subsystem 114 computes the power consumption associated with one or more workloads on a first rack of computing devices, being distributed power from one of PDUs 104A-N, and reassigns the one or more workloads to one or more computing devices on a different rack, thereby reducing the total power consumption of the first rack. For example, if PDU 104A is responsible for distributing power to a first portion of computing devices 106A-N (i.e., the first rack) and PDU 104A is approaching its power threshold for distribution, workload reassignment subsystem 114 can dynamically reassign one or more workloads from any of computing devices 106A-N to any of a second portion of computing devices 106A-N. In this example, if PDU 104N is distributing power to the second portion of computing devices 106A-N, governor 110 can communicate (via workload reassignment subsystem 114) with PDU 104N and the second portion of computing devices 106A-N to ensure that there is sufficient capacity on the second portion of computing devices 106A-N to take on the additional reassigned workload, and that moving the workload from the first rack to any of the second portion of computing devices 106A-N will not lead to the total power draw on PDU 104N to exceed its power threshold for distribution.

The reassignment of workloads as described herein can be based on the predefined workload priority, e.g., development and testing workloads can be reassigned prior to production workloads being reassigned. In general, actions taken by workload reassignment subsystem 114 to reassign workloads can be based on the default or preconfigured rules by which governor 110 operates.

PSU configuring subsystem 115, at step 308, manages the distribution of power to computing devices 106A-N by dynamically configuring the amounts of power being drawn by each of a plurality of PSUs. In an embodiment, computing devices 106A-N each have a plurality of PSUs (e.g., PSUs 107A-N), and each of the plurality of PSUs for a given computing device are connected to different PDUs 104A-N. For example, computing device 106A can have two PSUs, e.g., PSUs 107A comprising PSU A and PSU B (neither shown), and PSU A is connected to PDU 104A whereas PSU B is connected to PDU 104N. In this example, PSU configuring subsystem 115 can configure PSU A to draw 25% of the total power consumption of computing device 106A from PDU 104A, while PSU B is configured to draw 75% of the total power consumption from PDU 104N.

Thus, PSU configuring subsystem 115 can, in general, vary the power distribution requirements of PDUs 104A-N by having a plurality of PSUs (e.g., PSUs 107A-N) in one or more of computing devices 106A-N draw unequal amounts of power from separate PDUs to which they are connected. This varying of power distribution requirements can be based on the default or preconfigured rules by which governor 110 operates.

Source switching subsystem 116, at step 310, manages the supply of power to PDUs 104A-N by transferring at least a portion of power being supplied to any of PDUs 104A-N between different power sources 102A-N to which they are connected. In an embodiment, power sources 102A-N can each be connected to PDUs 104A-N for supplying power and source switching subsystem 116 can transfer at least a portion of the power supply to any of PDUs 104A-N between power sources 102A-N. This can be accomplished by source switching subsystem 116 activating a mechanism, such as a transfer switch, which can transfer at least a portion of the power supply associated with a first power source, connected to a PDU, to a second power source, also connected to the PDU, thereby reducing the total power supply from the first power source.

As an illustrative example, PDU 104A can be connected to separate power sources 102A and 102N and source switching subsystem 116 can transfer 2 kW of power being supplied to PDU 104A from power source 102A to be supplied from power source 102N, thereby reducing the amount of power supplied to PDU 104A from power source 102A. Governor 110 can, in this example and in general, confirm that the transfer of power supply from one power source to another is safe to do prior to the transfer, i.e., a transfer will not exceed a maximum power supply a power source is capable of. This transfer of power supply between power sources can be based on the default or preconfigured rules by which governor 110 operates.

It should be noted that after governor 110 has taken an action at any of steps 306, 308 or 310, it can subsequently resume monitoring PDUs 104A-N to determine if any of their respective power thresholds are being approached, as previously described. Additionally, if after taking configured actions (e.g., steps 306, 308 and 310) governor 110 determines that a power threshold is still being approached on any of PDUS 104A-N, governor 110 can generate and send an alert, at step 312, to inform a user of console 108 that a manual intervention may be required to manage power distribution and/or consumption. The generated alert can comprise, but is not limited to, a pop-up notification rendered on a display screen of console 108 and/or an email or text message alert sent to a designated recipient.

Figure 4:
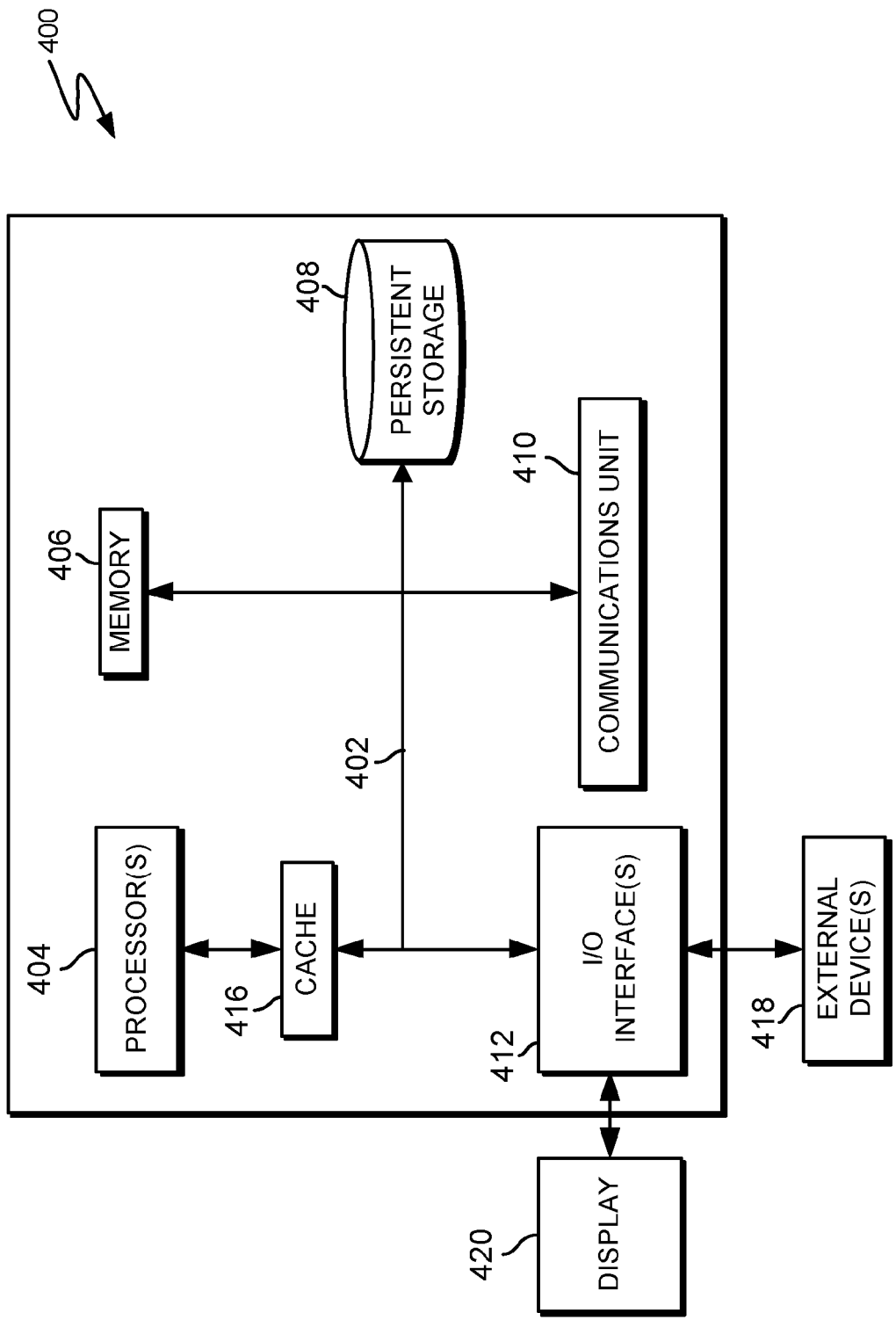
FIG. 4 is a block diagram of components of the console computer executing the governor program, in accordance with an embodiment of the present invention.

FIG. 4 depicts a block diagram 400 of components of console 108, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Console 108 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Governor 110 can be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 can provide communications through the use of either or both physical and wireless communications links. Governor 110 can be downloaded to persistent storage 408 through communications unit 410.

I/O interface(s) 412 allows for input and output of data with other devices that can be connected to console 108. For example, I/O interface 412 can provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., governor 110, can be stored on such portable computer readable storage media and can be loaded onto persistent storage 408 via I/O interface(s) 412. I/O interface(s) 412 also connect to a display 420. Display 420 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing power distribution to computing devices, the method comprising:
monitoring power consumption of a plurality of computing devices and power draw on a plurality of power distribution units (PDUs), wherein the plurality of power distribution units distribute power to the plurality of computing devices;
determining that any of the plurality of power distribution units are approaching respective power thresholds; and
responsive to determining that any of the plurality of power distribution units are approaching the respective power thresholds, taking one or more actions to manage power distribution to the plurality of computing devices, wherein the one or more actions are based on a set of rules comprising workload priorities and the one or more actions comprise configuring a plurality of power supply units of the plurality of computing devices, respectively, to draw unequal amounts of power from the plurality of the power distribution units, respectively and capping power consumption of computing devices processing workloads associated with development or testing while not capping workloads associated with production, wherein the capping is based on suspending processes.

2. The method of claim 1, wherein the unequal amounts of power are drawn by a plurality of power supply units in one or more of the plurality of computing devices.

3. The method of claim 1, wherein the one or more actions further comprise at least one of transferring at least a portion of power supply to at least one of the plurality of power distribution units from a first power source to a second power source and reassigning one or more workloads.

4. The method of claim 1, wherein the set of rules is associated with at least one of device priorities, power consumption maximums and power consumption minimums.

5. The method of claim 3, wherein the transferring at least a portion of power supply from the first power source to the second power source is accomplished with a use of a transfer switch.

6. The method of claim 1, further comprising:
generating an alert for a manual management of power distribution, wherein the alert is at least one of a pop-up notification and at least one of an email and a text message sent to a designated recipient.

7. The method of claim 1, wherein a determination that any of the plurality of power distribution units are approaching the respective power thresholds is based on at least one of a predetermined threshold and a dynamically determined threshold.

8. A computer program product for managing power distribution to computing devices, the computer program product comprising:
one or more computer readable storage media and program instructions stored on the one or more computer readable storage media, the program instructions comprising:
program instructions to monitor power consumption of a plurality of computing devices and power draw on a plurality of power distribution units, wherein the plurality of power distribution units distribute power to the plurality of computing devices;
program instructions to determine that any of the plurality of power distribution units are approaching respective power thresholds; and
program instructions to, responsive to determining that any of the plurality of power distribution units are approaching the respective power thresholds, take one or more actions to manage power distribution to the plurality of computing devices, wherein the one or more actions are based on a set of rules comprising workload priorities and the one or more actions comprise configuring a plurality of power supply units of the plurality of computing devices, respectively, to draw unequal amounts of power from the plurality of the power distribution units, respectively and capping power consumption of computing devices processing workloads associated with development or testing while not capping workloads associated with production, wherein the capping is based on suspending processes.

9. The computer program product of claim 8, wherein the unequal amounts of power are drawn by a plurality of power supply units in one or more of the plurality of computing devices.

10. The computer program product of claim 8, wherein the one or more actions further comprise at least one of transferring at least a portion of power supply to at least one of the plurality of power distribution units from a first power source to a second power source and reassigning one or more workloads.

11. The computer program product of claim 8, wherein the set of rules is associated with at least one of device priorities, power consumption maximums and power consumption minimums.

12. The computer program product of claim 10, wherein the transferring at least a portion of power supply from the first power source to the second power source is accomplished with a use of a transfer switch.

13. The computer program product of claim 8, further comprising:
program instructions to generate an alert for a manual management of power distribution, wherein the alert is at least one of a pop-up notification and at least one of an email and a text message sent to a designated recipient.

14. The computer program product of claim 8, wherein a determination that any of the plurality of power distribution units are approaching the respective power thresholds is based on at least one of a predetermined threshold and a dynamically determined threshold.

15. A computer system for managing power distribution to computing devices, the computer system comprising:
one or more computer processors;
one or more computer readable storage media;
program instructions stored on the one or more computer readable storage media for execution by at least one of the one or more processors, the program instructions comprising:
program instructions to monitor power consumption of a plurality of computing devices and power draw on a plurality of power distribution units, wherein the plurality of power distribution units distribute power to the plurality of computing devices;
program instructions to determine that any of the plurality of power distribution units are approaching respective power thresholds; and
program instructions to, responsive to determining that any of the plurality of power distribution units are approaching the respective power thresholds, take one or more actions to manage power distribution to the plurality of computing devices, wherein the one or more actions are based on a set of rules comprising workload priorities and the one or more actions comprise configuring a plurality of power supply units of the plurality of computing devices, respectively, to draw unequal amounts of power from the plurality of the power distribution units, respectively and capping power consumption of computing devices processing workloads associated with development or testing while not capping workloads associated with production, wherein the capping is based on suspending processes.

16. The computer system of claim 15, wherein the unequal amounts of power are drawn by a plurality of power supply units in one or more of the plurality of computing devices.

17. The computer system of claim 15, wherein the one or more actions further comprise at least one of transferring at least a portion of power supply to at least one of the plurality of power distribution units from a first power source to a second power source and reassigning one or more workloads.

18. The computer system of claim 15, wherein the set of rules is associated with at least one of device priorities, power consumption maximums and power consumption minimums.

19. The computer system of claim 17, wherein the transferring at least a portion of power supply from the first power source to the second power source is accomplished with a use of a transfer switch.

20. The computer system of claim 15, further comprising:
program instructions to generate an alert for a manual management of power distribution, wherein the alert is at least one of a pop-up notification and at least one of an email and a text message sent to a designated recipient.

\* \* \* \* \*